C. A. SWANSON.
MOWER GUARD.
APPLICATION FILED JULY 2, 1917.

1,363,288.

Patented Dec. 28, 1920.

Witnesses:
C. E. Wessels
B. G. Richards

Inventor:
Charles A. Swanson,
By Joshua R H Potts
his Attorney.

UNITED STATES PATENT OFFICE.

CHARLES A. SWANSON, OF CHICAGO, ILLINOIS.

MOWER-GUARD.

1,363,288.

Specification of Letters Patent.    Patented Dec. 28, 1920.

Application filed July 2, 1917. Serial No. 178,149.

*To all whom it may concern:*

Be it known that I, CHARLES A. SWANSON, a citizen of the United States, and a resident of the city of Chicago, county of Cook, and State of Illinois, have invented certain new and useful Improvements in Mower-Guards, of which the following is a specification.

My invention relates to improvements in mower guards, and has for its object the provision of an improved mounting for the ledger plate of the guard whereby said ledger plate is firmly and securely mounted in place and may be readily removed or replaced for sharpening or other purposes without disturbing the adjustment of the guard and without danger of entanglement with external objects such as the blades or stalks of grass, grain or the like.

The invention consists in the combinations and arrangements of parts hereinafter described and claimed.

The invention will be best understood by reference to the accompanying drawings forming a part of this specification, and in which—

Figure 1:
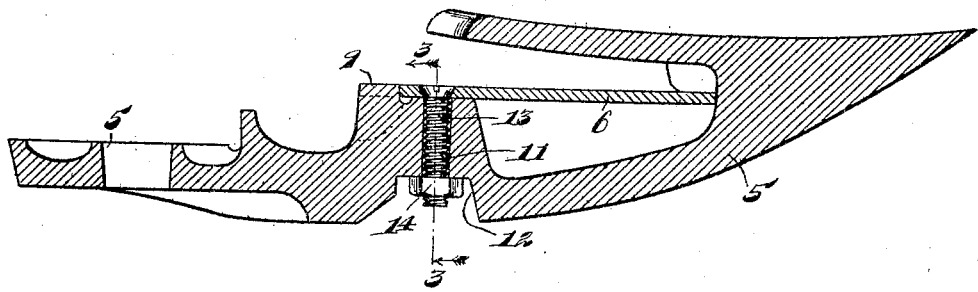
Figure 2:
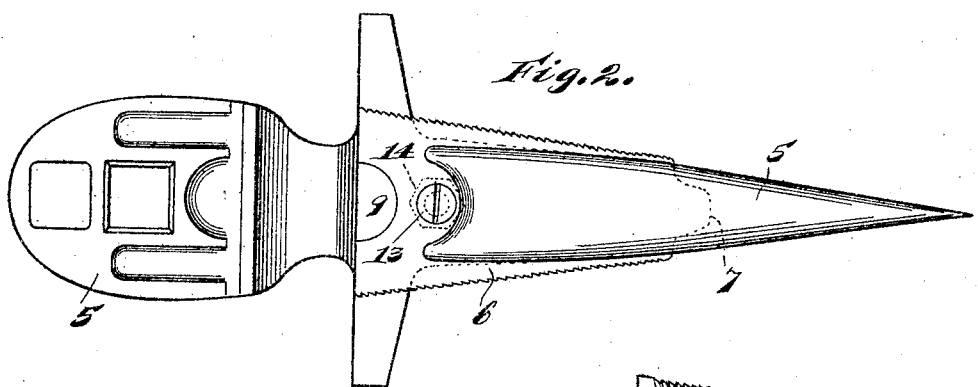
Figure 4:
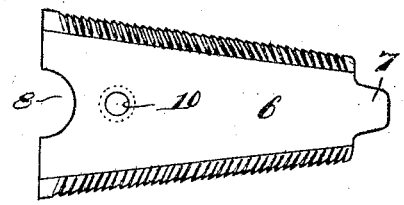
Figure 3:
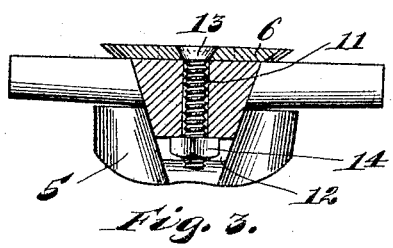

Figure 1 is a longitudinal section of a mower guard detached, embodying my invention, Fig. 2, a top plan view of the same, Fig. 3, a transverse section taken on line 3—3 of Fig. 1, and Fig. 4, a plan view of the ledger plate detached from the guard.

The preferred form of construction, as illustrated in the drawings, comprises an ordinary mower guard 5 of usual or desirable construction and having the usual ledger plate 6 removably mounted therein. The plate 6 is provided with the usual lug 7 at its forward end and recess 8 at its rear end, the lug 7 being adapted to fit in the usual recess provided for that purpose in the guard 5 and the recess 8 being adapted to fit over the usual lug 9, as indicated. The ledger plate 6 is provided with a counter-sunk bolt hole 10 registering with a bolt hole 11 passing entirely through the guard 5 and communicating at its lower end with a recess 12 of comparatively great width, extending entirely across the guard and having its rear edge beveled as shown to facilitate passage over the ground without accumulation of earth, etc. A flat headed screw bolt 13 is passed through the ledger plate 6 and the guard 5 and secured in place by means of a nut 14 located in the recess 12. By this arrangement, the ledger plate 6 in each of the mower guards employed, may be readily removed or replaced for sharpening or other repairs without disturbing the original adjustment of the guard and the nut and threads of the securing bolt will be concealed and protected in the recess 12 so that there is no danger of entanglement therewith of the blades or stalks of grass, grain or the like during operation of the mower. By this arrangement, the lower or bolt end of the screw bolt 13 is fully exposed when the nut 14 is removed so that in case of sticking or rusting in place, the same may be readily removed by a few slight taps of a hammer on a punch or the like, thus greatly facilitating the removal and replacement of the ledger plate. As will be noted, the bolt hole 11 is made amply large for the accommodation of the bolt 13 and the hole in the ledger plate a trifle smaller, thus exposing the edge through the bolt hole to facilitate removal, the ledger plate being accurately positioned by means of the lug 7 and recess 8, as will be understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

The combination with a mower guard provided with a ledger plate seat therein, there being a bolt hole extending from said ledger plate seat downwardly through said guard, and there being also a comparatively large recess in the bottom of said guard at the lower end of said bolt hole; a ledger plate positioned in said seat and provided with a bolt hole registering with the bolt hole in the guard; a securing bolt passed through the bolt holes of said plate guard; and a nut threaded on said bolt and resting in said recess, said recess being larger and deeper than said nut, and having its rear side rearwardly beveled, substantially as described.

In testimony whereof I have signed my name to this specification in the presence of two subscribing witnesses.

CHARLES A. SWANSON.

Witnesses:
JOSHUA R. H. POTTS,
HELEN F. LILLIS.